D. S. JOHNSTON.
MINE CAR TRUCK.
APPLICATION FILED JAN. 24, 1914.

1,093,783.

Patented Apr. 21, 1914.

2 SHEETS—SHEET 1.

Witnesses

Inventor
D. S. Johnston
By Geo. L. Evans
Attorney

D. S. JOHNSTON.
MINE CAR-TRUCK.
APPLICATION FILED JAN. 24, 1914.
1,093,783.
Patented Apr. 21, 1914.
2 SHEETS—SHEET 2.
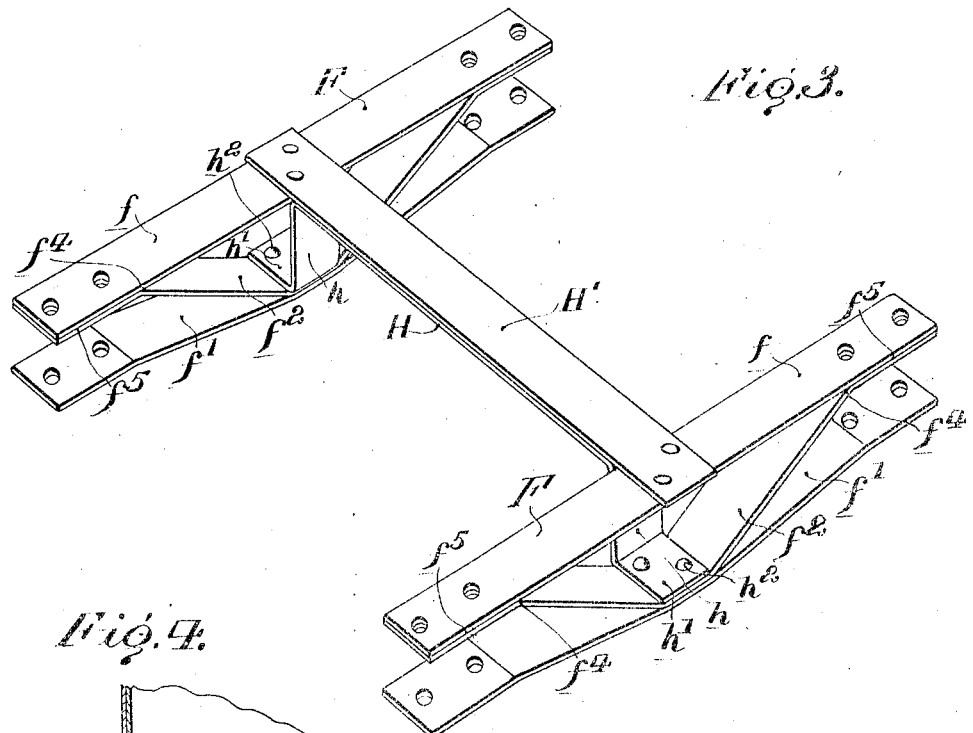
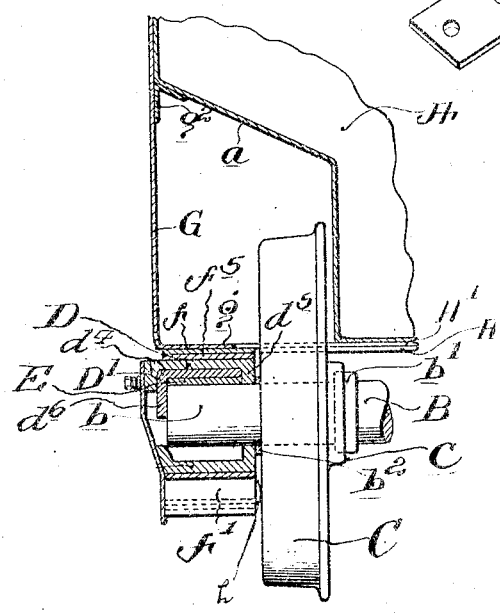
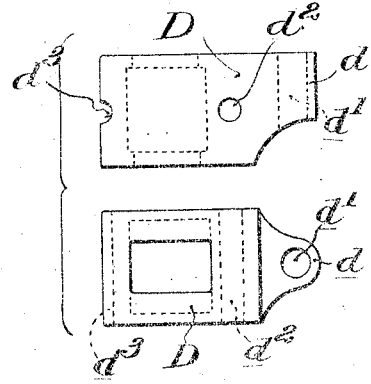

UNITED STATES PATENT OFFICE.

DAVID S. JOHNSTON, OF HIAWATHA, UTAH.

MINE-CAR TRUCK.

1,093,783.　　　　Specification of Letters Patent.　　Patented Apr. 21, 1914.

Application filed January 24, 1914. Serial No. 814,158.

*To all whom it may concern:*

Be it known that I, DAVID S. JOHNSTON, a citizen of the United States, residing at Hiawatha, in the county of Carbon and State of Utah, have invented certain new and useful Improvements in Mine-Car Trucks, of which the following is a specification.

My invention relates to trucks for mine cars.

The objects of the invention are to provide a novel form of truck having its two side members connected by a transverse middle bar bent down at its ends and thence outwardly and there connected to the lower bars and the longitudinal braces of the two truck members; a top bar overlying the said middle bar and overlying at its ends and secured to the longitudinal top bars of the two side truck members.

A further object is to form the journal boxes with integral extensions provided with spragging holes through which the spragging bar may be passed between the outer ends of the wheel spokes.

A further object is to hold the journal boxes between the upper and lower truck bars at the ends of the truck members by bolts passed down through the said bars and holes in the boxes. Also to hold the axle from endwise movement in one direction by a depending lip on the wedge which holds the journal brass in the box; said box in turn holding the wedge and brass in place. Also to support the ends of the side members of the truck from the body of the car by vertical braces bolted to the sides of the car and to the said side members. Also to relieve the strain on the bolts securing the vertical braces to the car body by angle supports.

Figure 1:
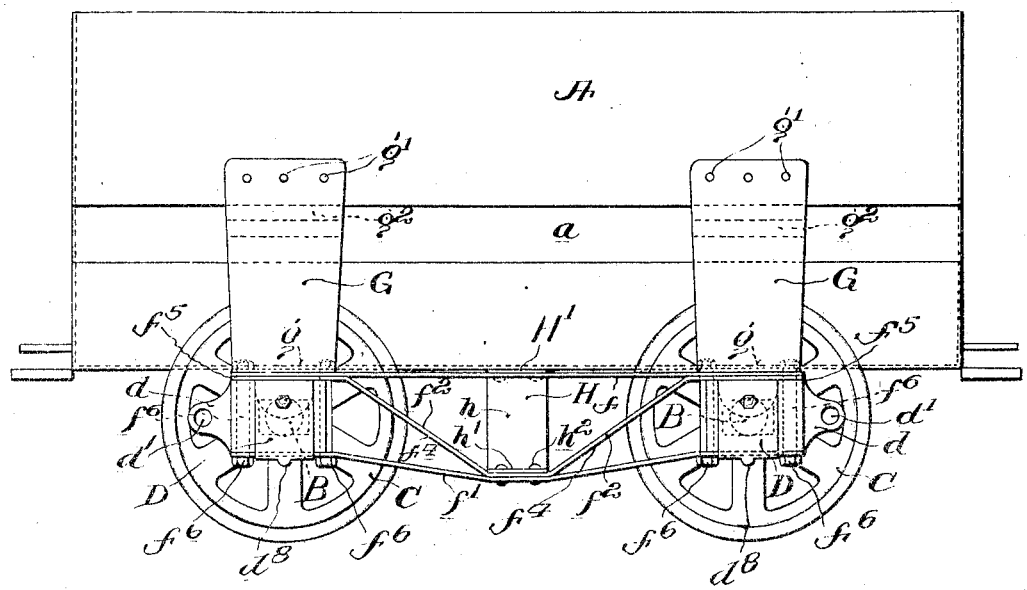
Figure 2:
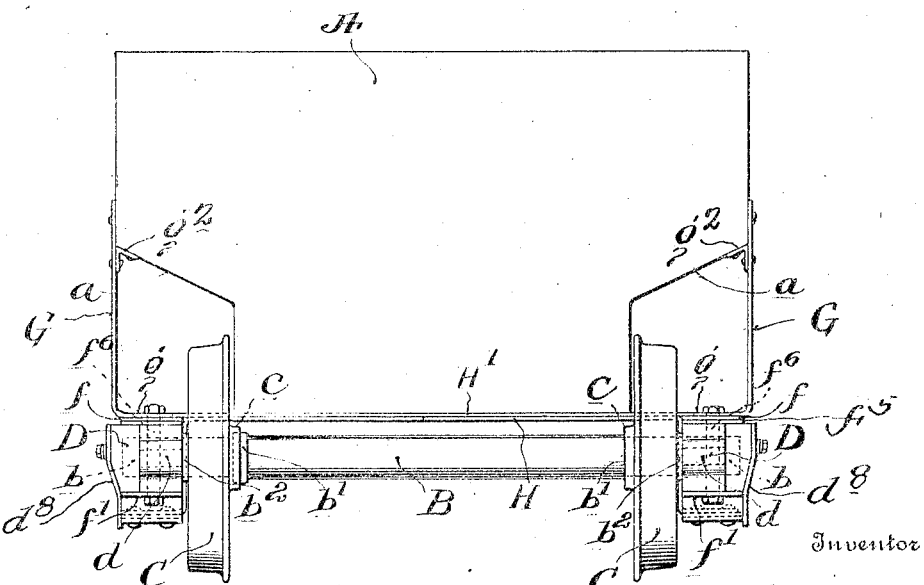

These objects I accomplish by the construction shown in the accompanying drawings, in which:

Figure 1 is a side elevation of a mine car provided with my improved truck. Fig. 2 is an end elevation. Fig. 3 is a perspective of the truck removed from the car body with the journal boxes omitted. Fig. 4 is a sectional view on line 4—4 of Fig. 1, through one of the journal boxes and braces. Fig. 5 is a detail view showing the journal box in plan and side elevation.

A designates a mine car body having its sides inclined inwardly and downwardly, as shown at $a$ $a$.

B is the axle provided with the usual straight-spoked wheels C and having its journals $b$ $b$ journaled in the boxes D. Each journal box D has cast with it a longitudinal extension $d$ provided with a transverse spragging hole $d'$, through which may be passed a sprag bar to engage the wheel spokes to lock the wheel against rotation and cause it to slide on the track. The box D is provided with a vertical bolt hole $d^2$ at right angles to the sprag hole $d'$ and at its opposite end is provided with a vertical half round bolt groove $d^3$. Every axle box D has an oil and waste space in its bottom, and within its top between its outer and inner walls $d^4$ $d^5$ is placed the wedge D' and brass E. The outer end of the wedge D' is provided with a depending lip or flange $d^6$ which holds the brass E from outward movement and also forms a thrust bearing for the end of the axle B. The boxes D have suitable lids $d^8$. The axle boxes D are supported in the ends of the truck to be now described. The truck comprises two side members F F formed of upper and lower longitudinal bars $f$ $f'$ and intermediate longitudinal strut or brace $f^2$. These three members are of equal length and the strut or brace $f^2$ is secured at its middle to the middle of the lower bar $f'$ and is inclined upwardly therefrom to the under side of the upper bar $f$, as at $f^4$, and extends thence along the under side of the bar $f$, as at $f^5$. Parallel vertical bolts $f^6$ extend down through the ends of the bars $f$ $f'$ and strut $f^2$ and through the bolt holes $d^2$ and grooves $d^3$ in the journal boxes D and so hold the same in place within the open rectangular spaces at the ends of the two truck members F. The bolts $f^6$ also extend through the lower inturned ends $g$ of the vertical braces G, bolted or riveted at their upper ends, as at $g'$, to the sides of car body A; these braces G being braced in turn by the angle plates $g^2$ secured to their inner faces and to the car body at the beginning of the inclined side portions $a$. These angle plates $g^2$ thus relieve the bolts or rivets $g'$ from strain and greatly strengthen the braces G.

The two truck members F F are connected together at their middle portions by a transverse bar H which is bent down at its ends alongside the inner sides of the members F F, as shown at $h$ $h$, and thence outwardly, as at $h'$ $h'$, to form flanges which overlie the middle portions of the lower bars $f'$ $f'$, and braces $f^2$, where all three parts are bolted or riveted together, as at $h^2$. Overlying and bolted to the bar H is a top bar H'; the ends of which extend over and are bolted or riveted to the middle portions of the upper longitudinal bars $f$ $f$ of the truck members. The two bars H, H' thus form a composite transverse brace forked at its ends to engage the upper and lower sides of the side members F. An extremely strong and rigid construction of truck is thus afforded and this is further strengthened by the braces G which connect the four corners of the truck to the car body A and balance the same. This construction also affords clearance between bottom of car and ground for the sheaves and rollers on the track.

Each axle B has a shoulder $b'$ which enters a dust cup $c$ on the inner side of the adjacent loose wheel B and at the opposite side of this wheel is a washer $b^2$ spacing that face of the wheel from the inner face of the adjacent journal box.

What I claim is:

1. A truck for mine cars comprising, the two side members open at their ends to receive the journal boxes, a transverse brace to support the car body and secured at its ends to the middle portions of the said side members, and vertical braces secured at their lower ends to the ends of the side members and adapted at their upper ends to be secured to the sides of a car body.

2. A truck for mine cars comprising, the two side members open at their ends to receive the journal boxes, a transverse brace to support the car body and secured at its ends to the middle portions of the said side members, vertical braces secured at their lower ends to the ends of the side members and adapted at their upper ends to be secured to the sides of a car body, and angle plates or shoulders on the inner sides of said vertical braces to engage the incline portions of the sides of a car.

3. A truck for mine cars comprising, two side members having journal box-receiving openings at their opposite ends, a transverse brace to support the car, and having its ends forked and rigidly secured to the middle portions of the upper and lower sides of the said side members.

4. A truck for mine cars comprising, two side members each formed of upper and lower bars spaced at their opposite ends to form journal-box-receiving openings, a longitudinal strut bent down at its middle and secured to the lower longitudinal bar and thence inclined upwardly and along the lower face of the upper bar to the ends thereof, a transverse brace extending from the middle of one side member to the other and thence downwardly and outwardly and bolted or riveted at its ends to the middle of the lower longitudinal truck bars and the middle of said longitudinal braces, and a top bar extending along the upper side of said transverse brace and bolted or riveted to the middle of the top bars of said side members.

5. A mine car provided with journal boxes formed with extensions at their outer ends having transverse sprag holes.

6. A mine car truck comprising, the two parallel side members, a transverse brace connecting the two side members at their middle portions and adapted to form a support for a car body at the middle of its bottom, and upright body supporting braces at the ends of the said side members.

In testimony whereof I affix my signature in presence of two witnesses.

DAVID S. JOHNSTON.

Witnesses:
 WILLIAM L. LAMPH,
 ROY E. BENSON.